US009274725B2

(12) United States Patent
Nakagawa

(10) Patent No.: US 9,274,725 B2
(45) Date of Patent: Mar. 1, 2016

(54) IMAGE FORMING SYSTEM AND SETTING SCREEN MANIPULATING METHOD FOR ALLOWING TERMINAL APPARATUS TO MANIPULATE SETTING SCREEN

(71) Applicant: KYOCERA Document Solutions Inc., Osaka (JP)

(72) Inventor: Hiroshi Nakagawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/641,356

(22) Filed: Mar. 7, 2015

(65) Prior Publication Data

US 2015/0254037 A1    Sep. 10, 2015

(30) Foreign Application Priority Data

Mar. 7, 2014    (JP) ................................. 2014-044999

(51) Int. Cl.
*G06F 3/12*    (2006.01)
(52) U.S. Cl.
CPC ............ *G06F 3/1231* (2013.01); *G06F 3/1285* (2013.01)
(58) Field of Classification Search
USPC ................................ 358/1.13, 1.14, 1.15, 1.5
See application file for complete search history.

(56) References Cited

U.S. PATENT DOCUMENTS

| 8,120,805 B2* | 2/2012 | Lim .............................. 358/1.15 |
| 2005/0134891 A1* | 6/2005 | Ishizaki ....................... 358/1.13 |
| 2006/0221377 A1* | 10/2006 | Nishio ......................... 358/1.14 |
| 2006/0293765 A1* | 12/2006 | Tanaka et al. .................. 700/15 |

FOREIGN PATENT DOCUMENTS

| JP | 2013-078035 A | 4/2013 |
| JP | 2013-157860 A | 8/2013 |

* cited by examiner

*Primary Examiner* — Allen H Nguyen
(74) *Attorney, Agent, or Firm* — Hawaii Patent Services; Nathaniel K. Fedde; Kenton N. Fedde

(57) ABSTRACT

Provided is an image forming system that allows a user to quickly reach a desired setting item so as to resume alteration of the setting of the image forming apparatus and a job manipulation between a mobile terminal and an image forming apparatus. The image forming apparatus starts an operation of changing the setting when an operation panel part is operated. Then, a terminal apparatus displays setting items of the image forming apparatus on a display panel in the form of a menu map. When an operation for determining a setting item is performed on a menu-map screen on the terminal apparatus, the image forming apparatus changes a setting screen to be displayed on the display panel to a setting screen for the setting item indicated by transmitted information.

2 Claims, 13 Drawing Sheets

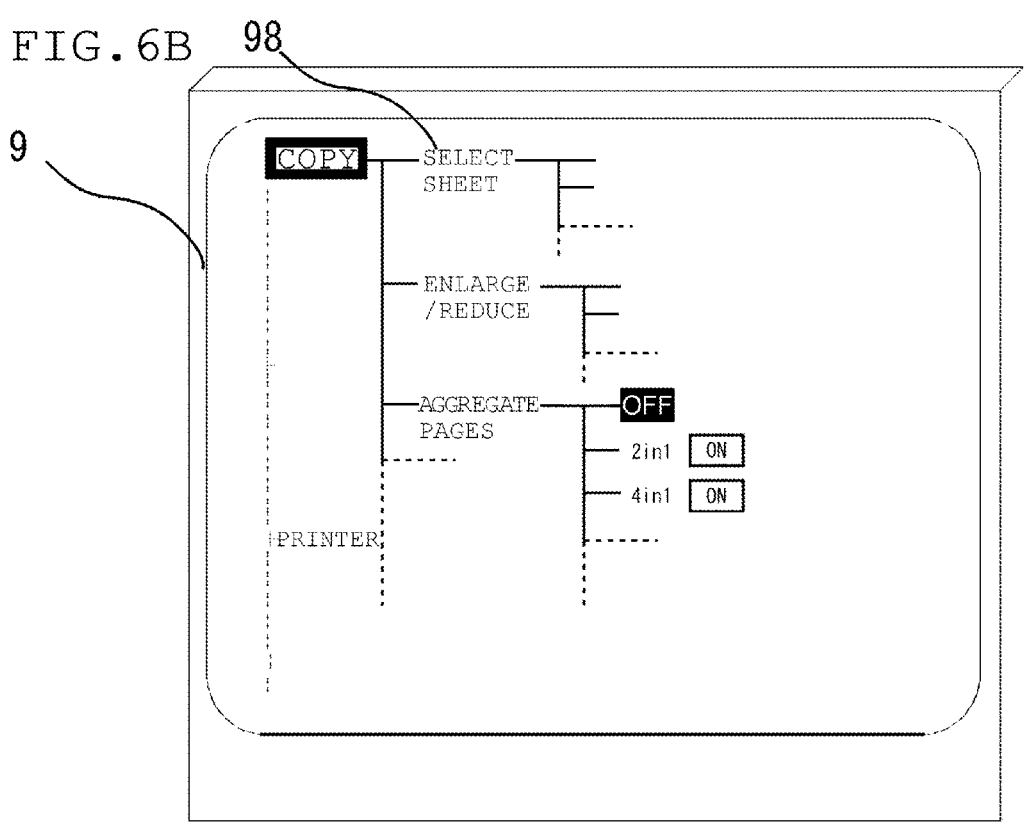

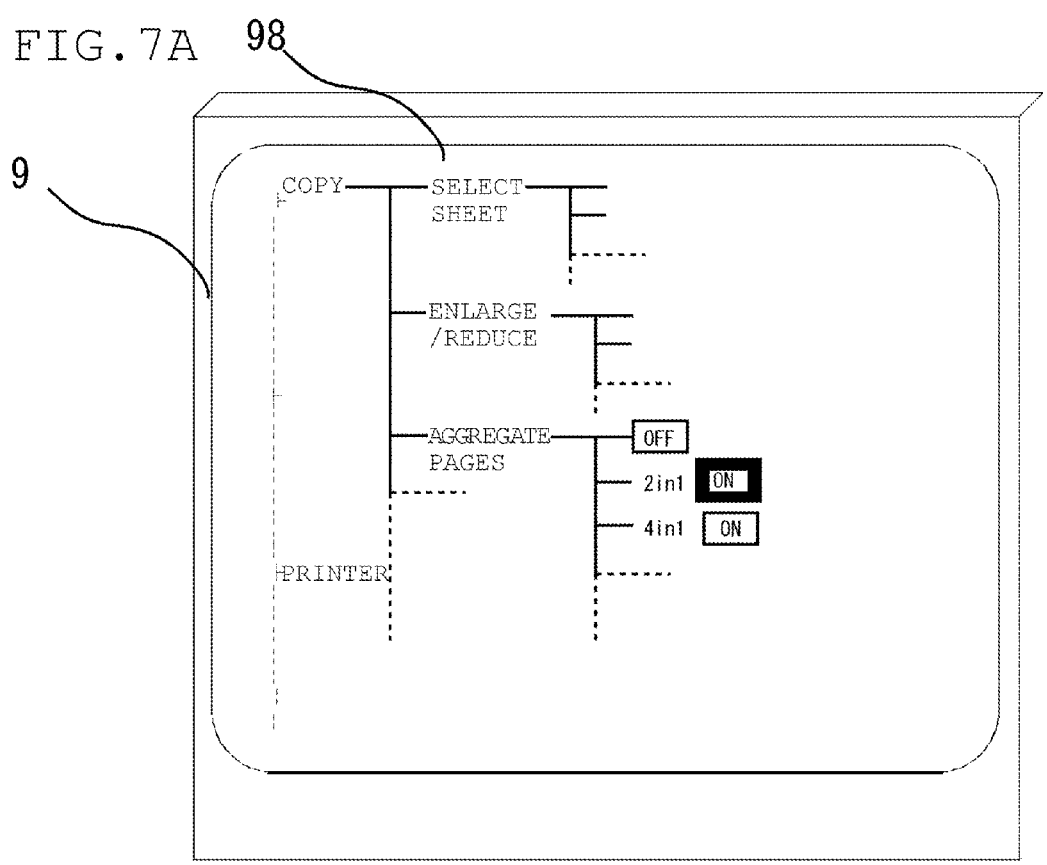

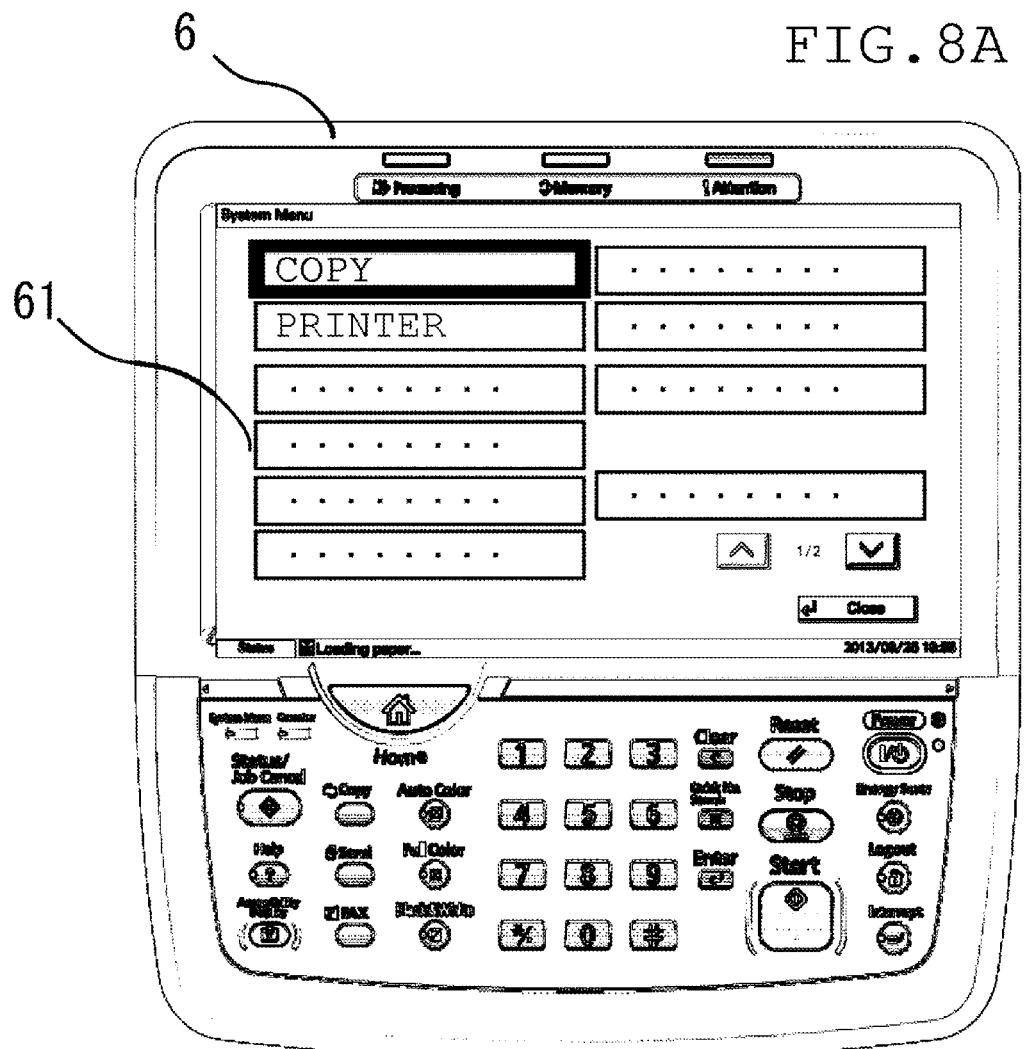

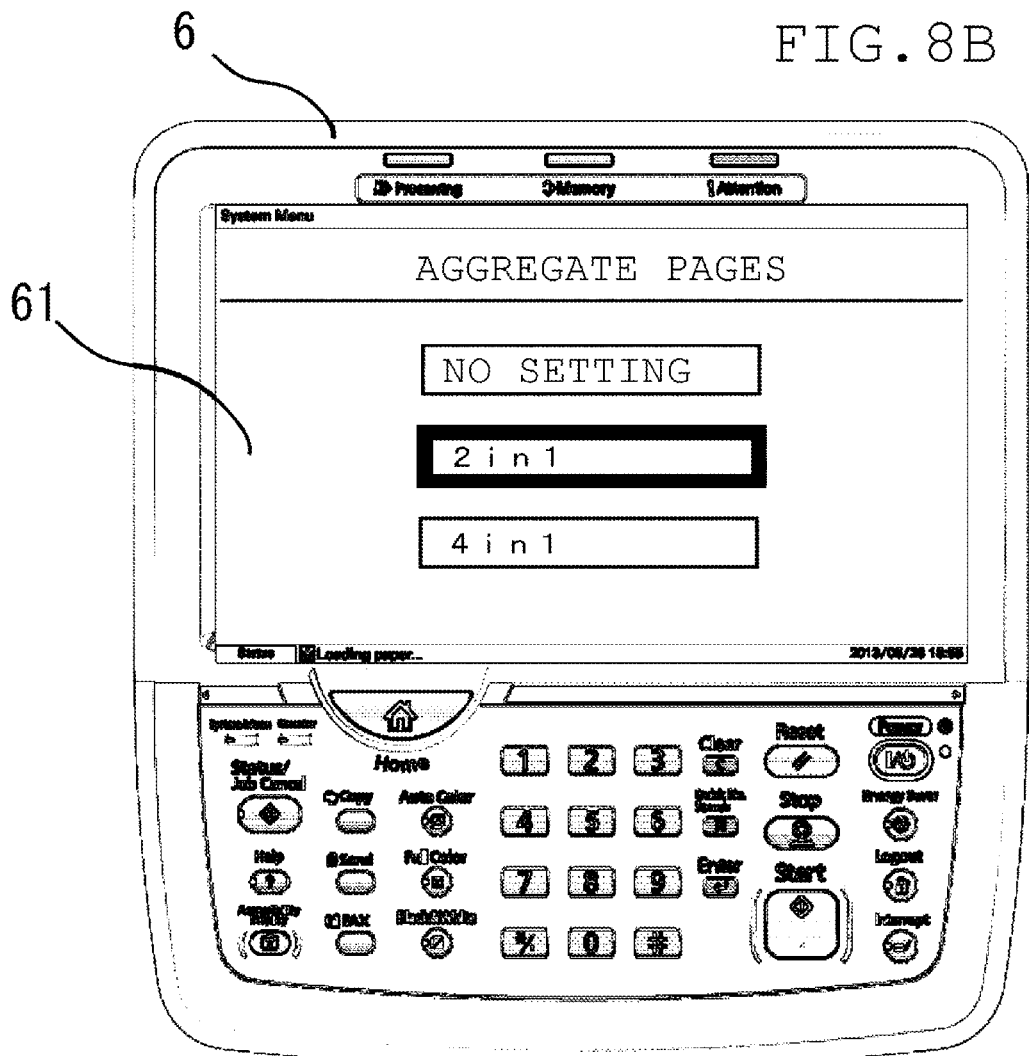

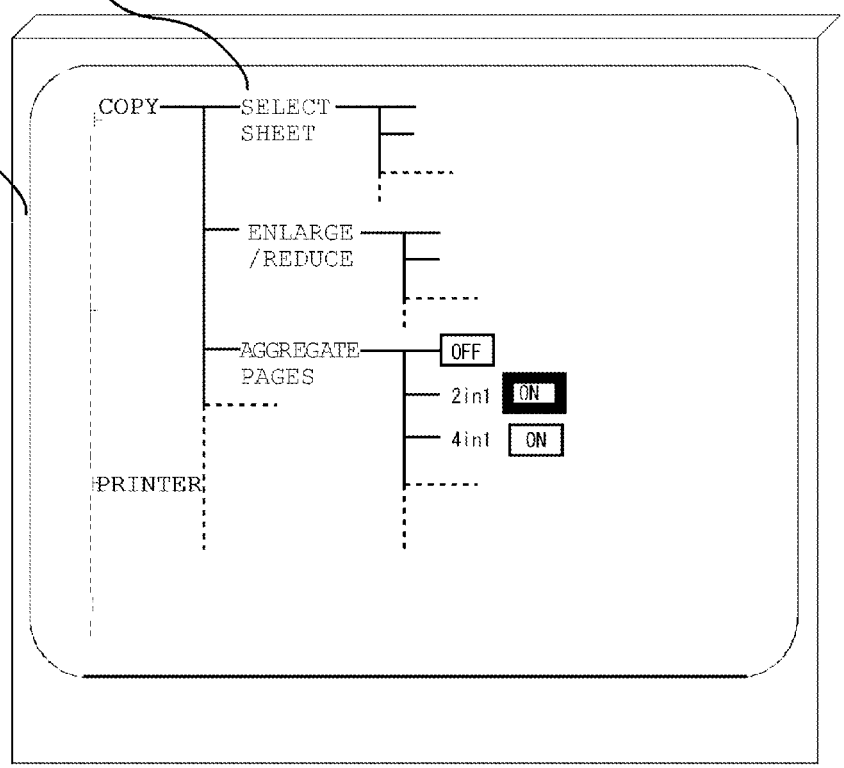

IMAGE FORMING SYSTEM AND SETTING SCREEN MANIPULATING METHOD FOR ALLOWING TERMINAL APPARATUS TO MANIPULATE SETTING SCREEN

INCORPORATION BY REFERENCE

This application is based on and claims the benefit of priority from Japanese Patent Application No. 2014-044999 filed on Mar. 7, 2014, the contents of which are hereby incorporated by reference.

BACKGROUND

The present disclosure relates to an image forming system and a setting screen manipulating method that allows a terminal apparatus to manipulate a setting screen of an image forming apparatus.

According to a typical case, an image forming apparatus sends to an information terminal apparatus information defining an operational screen for utilizing functions of the image forming apparatus. The information terminal apparatus creates an operational screen according to the received screen definition information and transmits an execution request to the image processing apparatus according to an operation that is performed by using the operational screen.

According to another typical case, a mobile terminal displays, on a display part, a screen for making a selection among image processing functions that are executable by a multifunction apparatus according to function selection information received from the multifunction apparatus. When a user selects one of the functions, the mobile terminal transmits item data indicating the selected function to the multifunction apparatus.

SUMMARY

An image forming system according to the present disclosure is a system to manipulate a setting screen of an image forming apparatus in a terminal apparatus. The terminal apparatus includes a setting-item display part, a selected-item display part, and an operation-result transmitting part. The setting-item display part displays setting items for the image forming apparatus in a form of a menu map. The selected-item display part displays an item selected in the setting items based on an operation of the terminal apparatus. The operation-result transmitting part transmits a result of an operation on the setting items displayed on the setting-item display part to the image forming apparatus. The image forming apparatus includes a transmission-result reflecting part. The transmission-result reflecting part reflects the result transmitted from the operation-result transmitting part on setting of the image forming apparatus and the setting screen.

A setting screen manipulating method according to the present disclosure is a method to manipulate to a setting screen of an image forming apparatus in a terminal apparatus. The setting screen manipulating method includes a setting-item display step, a selected-item display step, an operation-result transmitting step, and a transmission-result reflecting step. In the setting-item display step, the setting items for the image forming apparatus are displayed in a form of a menu map at the terminal apparatus. In the selected-item display step, a selected-item based on an operation of the terminal apparatus in the setting items displayed in the setting-item display step is displayed. In the operation-result transmitting step, a result of an operation of the terminal apparatus on the setting items displayed in the setting-item display step is transmitted to the image forming apparatus. In the transmission-result reflecting step, the result transmitted in the operation-result transmitting step is reflected on setting of the image forming apparatus and the setting screen.

BRIEF DESCRIPTION OF THE DRAWINGS

FIG. 6B is a diagram showing the terminal apparatus and the display panel.

FIG. 7A is a diagram showing the terminal apparatus and the display panel.

FIG. 8A is a diagram showing the operation panel part and the display panel.

FIG. 8B is a diagram showing the operation panel part and the display panel.

FIG. 9B is a diagram showing the terminal apparatus and the display panel.

DETAILED DESCRIPTION

<Embodiment>

Figure 1:
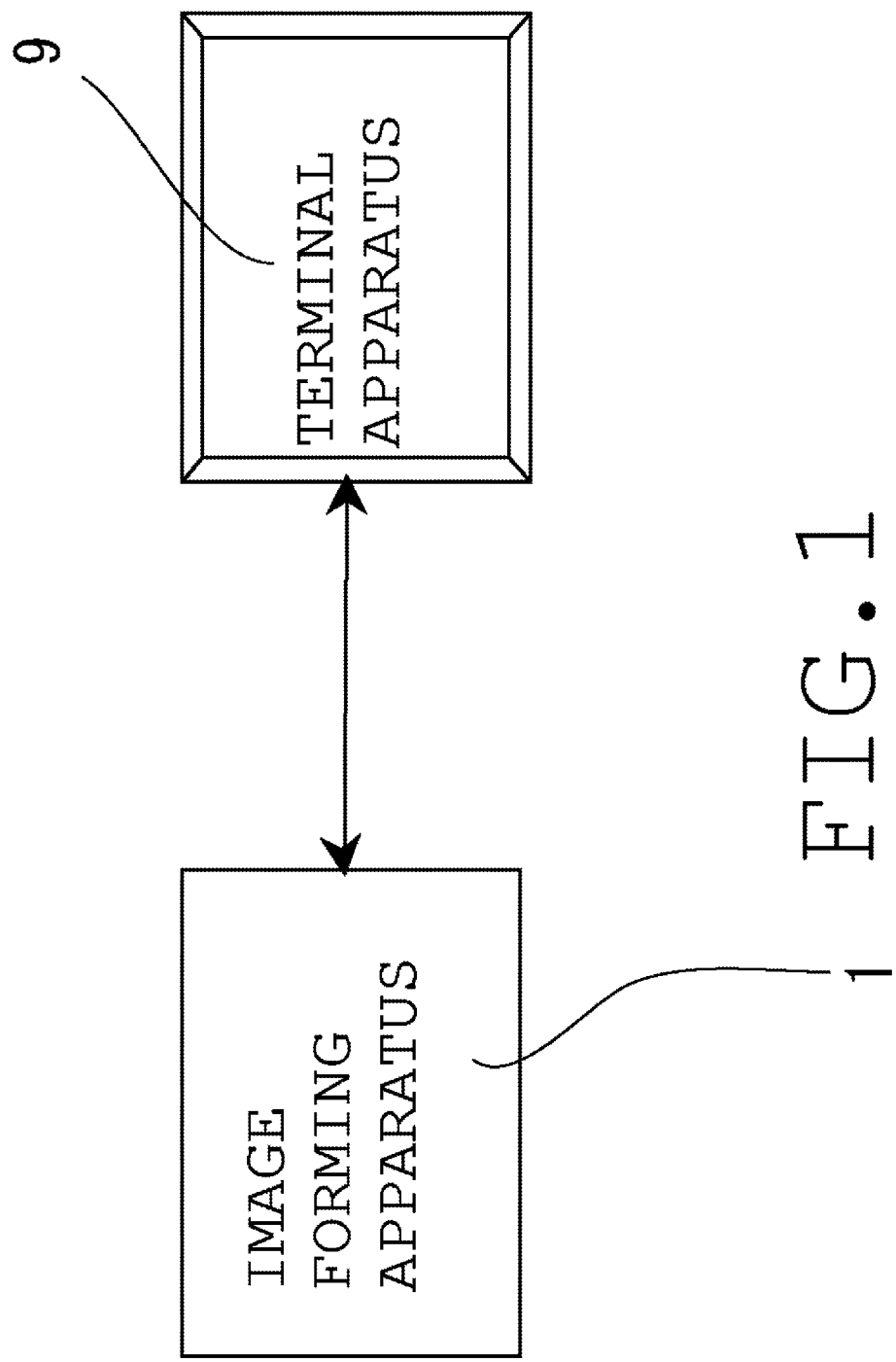
FIG. 1 is a schematic view illustrating an image forming system according to an embodiment of the present disclosure.

At first, as refer to FIG. 1, configuration of a print system according to an embodiment of the present disclosure described. FIG. 1 is a configurational diagram of the print system.

The print system includes an image forming apparatus 1 and a terminal apparatus 9 that is communicatable with the image forming apparatus 1.

[Configuration of Image Forming Apparatus 1]

Figure 2:
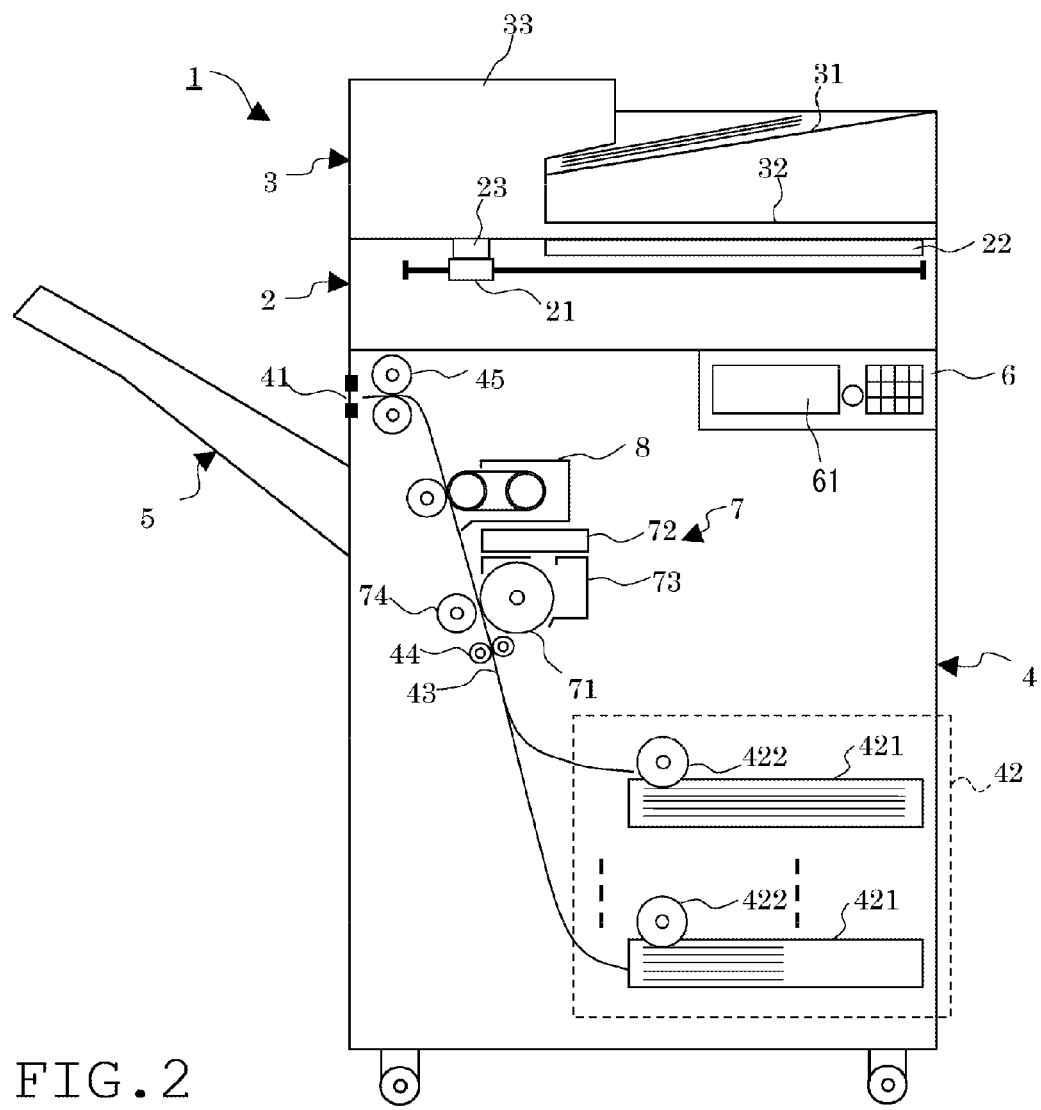
FIG. 2 is a schematic view illustrating the configuration of an image forming apparatus in FIG. 1.

Next, as refer to FIG. 2, configuration of the image forming apparatus 1 according to the embodiment of the present disclosure is described in detail.

As illustrated in FIG. 2, the image forming apparatus 1 according to the embodiment includes a manuscript reading part 2, a manuscript feeding part 3, a body part 4, a stack tray 5, and an operation panel part 6 (input part).

The manuscript reading part 2 is disposed above the body part 4, and the manuscript feeding part 3 is disposed above the manuscript reading part 2. The stack tray 5 is disposed on a side where a discharge opening 41 for recording sheets is provided in of the body part 4. The operation panel part 6 is disposed on the front side of the body part 4.

The manuscript reading part 2 includes a scanner 21, a platen glass 22, and a manuscript reading slit 23. The scanner 21 includes an exposure lamp and an imaging sensor or the like, and is configured to be movable in the direction where the manuscript feeding part 3 carries a manuscript. The platen glass 22 is a manuscript platen made of a transparent member such as glass. The manuscript reading slit 23 has a slit formed in a direction orthogonal to the manuscript carrying direction of the manuscript feeding part 3.

To read a manuscript placed on the platen glass 22, the scanner 21 is moved to a position facing the platen glass 22. In this case, the scanner 21 scans the manuscript placed on the platen glass 22 to acquire image data. The scanner 21 outputs the acquired image data to an image formation part 17 (FIG. 3) provided in a control circuit of the body part 4.

To read a manuscript which is fed by the manuscript feeding part 3, the scanner 21 is moved to a position facing the manuscript reading slit 23. The scanner 21 scans the manuscript via the manuscript reading slit 23 in synchronism with the feeding of the manuscript by the manuscript feeding part 3 to thereby acquire image data. The scanner 21 outputs the acquired image data to the image formation part 17 (FIG. 3) provided in the control circuit of the body part 4.

The manuscript feeding part 3 includes a manuscript mounting part 31, a manuscript discharge part 32, and a manuscript transport mechanism 33. A manuscript mounted on the manuscript mounting part 31 is fed out piece by piece and is transported to a position facing the manuscript reading slit 23 by the manuscript transport mechanism 33. The manuscript is then discharged to the manuscript discharge part 32. It is to be noted that the manuscript feeding part 3 may be configured to be foldable so that lifting the manuscript feeding part 3 above opens the top surface of the platen glass 22.

The body part 4 includes an image formation part 7. The body part 4 also includes a feeding part 42, a paper sheet conveying path 43, a conveying roller pair 44, and an ejection roller pair 45. The feeding part 42 includes a plurality of sheet paper cassettes 421 and a feed roller 422. The sheet paper cassettes 421 retain recording sheets, which are different in size or direction. The feed roller 422 feeds the recording sheets from the sheet paper cassettes 421 one at a time to the paper sheet conveying path 43.

The feed roller 422, the conveying roller pair 44, and the ejection roller pair 45 serve as conveyance part. The recording sheets are transported by the conveyance part. The recording sheet that is fed out onto the paper sheet conveying path 43 by the feed roller 422 is conveyed to the image formation part 7 by the conveying roller pair 44.

Then, the recording sheet on which recording is done by the image formation part 7 is ejected to the stack tray 5 by the ejection roller pair 45.

The operation panel part 6 includes a display panel 61 and an input part. The input part includes a start key, ten keys, an operation-mode change button, and buttons and a touch panel or the like for giving instructions. Modes such as copy, FAX transmission and a scanner can be acquired as operation modes by the input part. Also, by the buttons for giving instructions, instructions about printing, transmission, reception, saving, and recording can be acquired. That is, the operation panel part 6 accepts instructions for various jobs that are input to the image forming apparatus 1 by a user.

The operation panel part 6 also accepts an input of an authentication, such as a password, made by the user.

The image formation part 7 includes a photo conductor drum 71, an exposure part 72, a developing part 73, a transfer part 74, and a fixing apparatus 8. The exposure part 72 is an optical unit including a laser unit, a mirror, a lens, or the like. The exposure part 72 outputs light based on image data to expose the photo conductor drum 71, thereby forming an electrostatic latent image on the top surface of the photo conductor drum 71. The developing part 73 is a developing unit that develops the electrostatic latent image on the top surface of the photo conductor drum 71 with toner. The developing part 73 forms a toner image based on the electrostatic latent image on the photo conductor drum 71.

The transfer part 74 transfers the toner image, formed on the photo conductor drum 71, onto a recording sheet. The fixing apparatus 8 heats the recording sheet having the toner image transferred thereon by the transfer part 74 to fix the toner image on the recording sheet.

Next, the circuit configuration of the image forming apparatus 1 is described.

Figure 3:
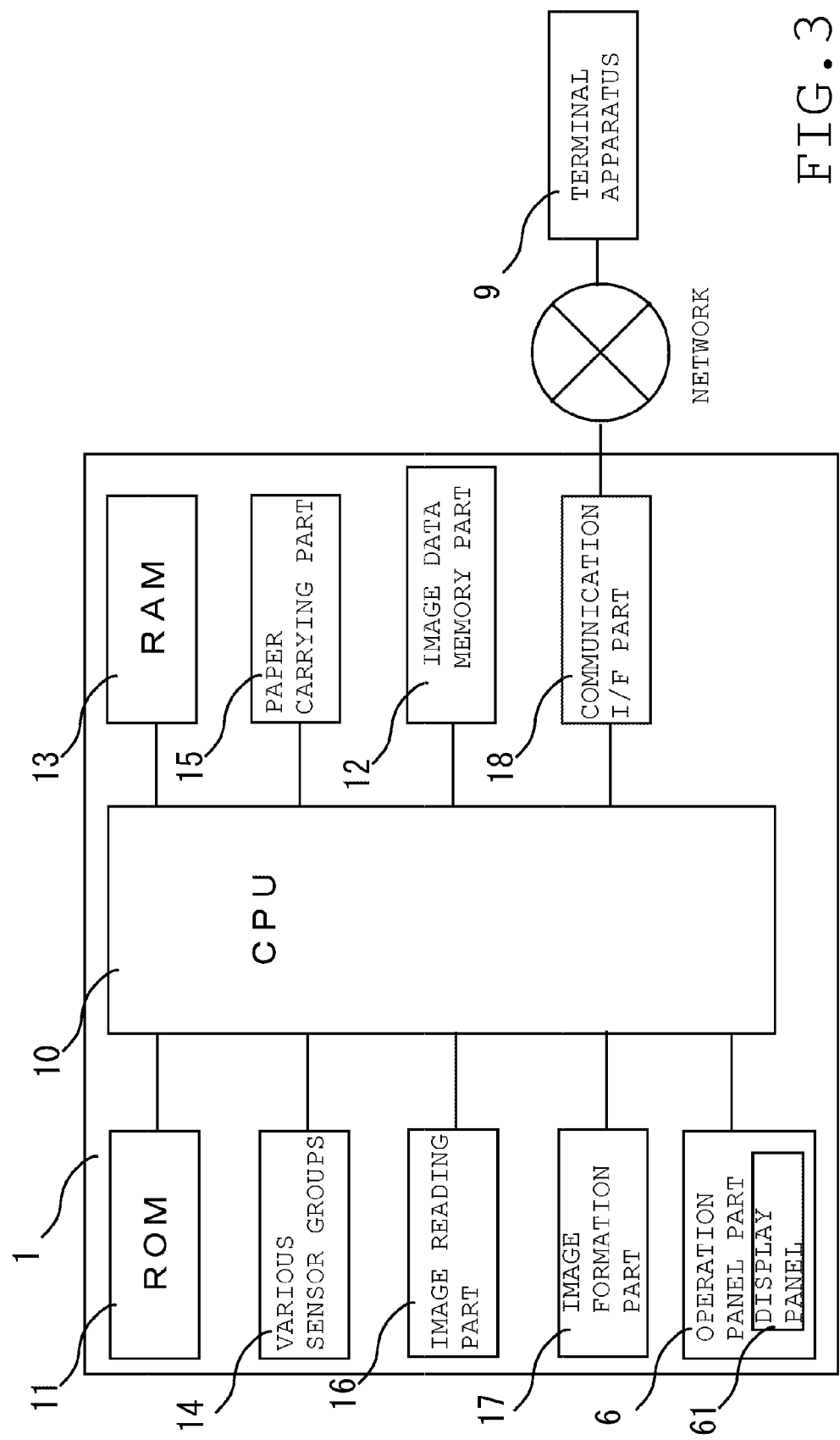
FIG. 3 is a schematic view illustrating the circuit configuration of the image forming apparatus in FIG. 1.

FIG. 3 is a schematic view illustrating the circuit configuration of the image forming apparatus 1.

The image forming apparatus 1 includes a CPU 10, a ROM 11, an image data memory part 12, a RAM 13, various sensor groups 14, a paper carrying part 15, an image reading part 16, the image formation part 17, a communication interface (I/F) part 18, the operation panel part 6, and a GPS information receiving part 20. The CPU 10 controls the operation of the image forming apparatus 1. The ROM 11 stores programs and data that are used in processes to be performed by the CPU 10. The image data memory part 12 stores image data for forming an image. The RAM 13 stores other data to be used in the processes of the CPU 10.

The paper carrying part 15 operates the manuscript discharge part 32 and the manuscript transport mechanism 33 of the manuscript feeding part 3, the conveyance part of the body part 4, and the like. The various sensor groups 14 include an imaging sensor provided in the body part 4, and the input part of the operation panel part 6. The image reading part 16 operates the scanner 21 of the manuscript reading part 2. The image formation part 17 operates the image formation part 7 and the transfer part 74. The communication I/F part 18 is used in communications over a network.

The CPU 10 controls the operation of the image forming apparatus 1 according to manipulation information input via the communication I/F part 18 from the terminal apparatus 9. Further, the CPU 10 transmits data necessary for the terminal apparatus 9 displaying a screen to the terminal apparatus 9 via the communication I/F part 18.

Also, when the operation panel part 6 is operated to start an operation for changing the setting of the image forming apparatus 1, the CPU 10 performs a menu-map screen display process to be described later with the terminal apparatus 9. As a result, the CPU 10 changes the setting of the image forming apparatus 1 and changes the display contents of a setting screen on the display panel 61 according to the result of the operation at the terminal apparatus 9.

Then, the terminal apparatus 9 is described.

Figure 4:
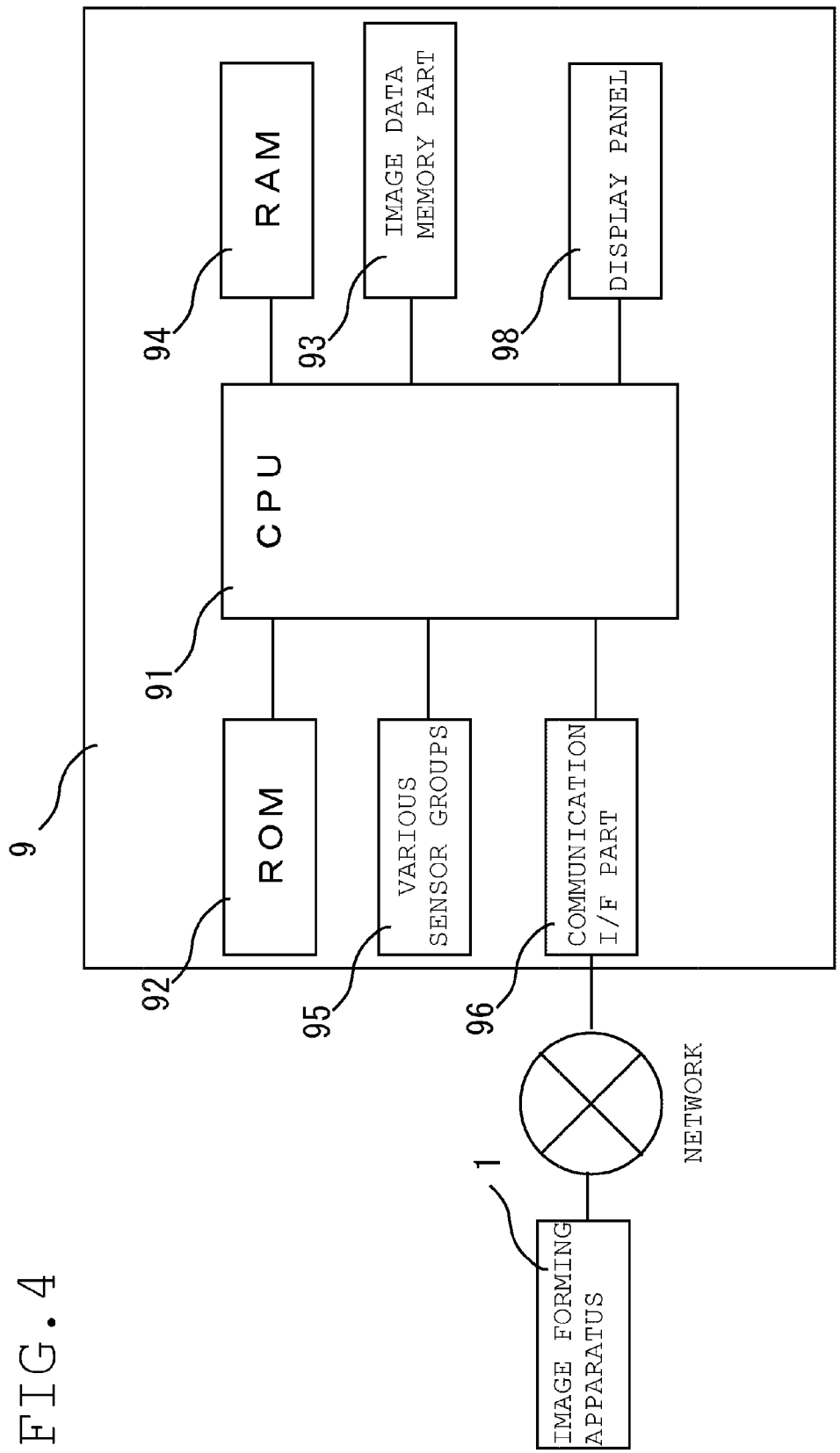
FIG. 4 is a schematic circuit diagram illustrating the configuration of a terminal apparatus in FIG.

FIG. 4 is a schematic circuit diagram illustrating the circuit configuration of the terminal apparatus 9.

The terminal apparatus 9 includes a CPU 91, a ROM 92, an image data memory part 93, a RAM 94, various sensor groups 95, a communication I/F part 96, and a display panel 98. The CPU 91 controls the operation of the terminal apparatus 9. The ROM 92 stores programs and data that are used in processes to be performed by the CPU 91. The image data memory part 93 stores image data for forming an image. The RAM 94 stores other data to be used in the processes of the CPU 91.

The various sensor groups 95 include a sensor that detects a manipulation performed on the display panel 98. The communication I/F part 96 is used in communications over a network. An operational application for operating the image forming apparatus 1 in communications over a network is stored in the ROM 92.

Under control of the operational application, the CPU 91 displays an image on the display panel 98 based on data transmitted from the image forming apparatus 1. Further, the CPU 91 transmits a result of an operation performed on the terminal apparatus 9 or the like by the user to the image forming apparatus 1.

The CPU 91 also performs the menu-map screen display process to be described later with the image forming apparatus 1. Accordingly, the CPU 91 transmits operation information on the terminal apparatus 9 on the menu-map screen to the image forming apparatus 1. Further, the CPU 91 changes a selected item on the menu-map screen according to the information transmitted from the image forming apparatus 1. The menu-map screen is a screen showing setting items displayed on the display panel 98 as the form of a menu map.

Then, the menu-map screen display process performed by the image forming system is described.

Figure 5:
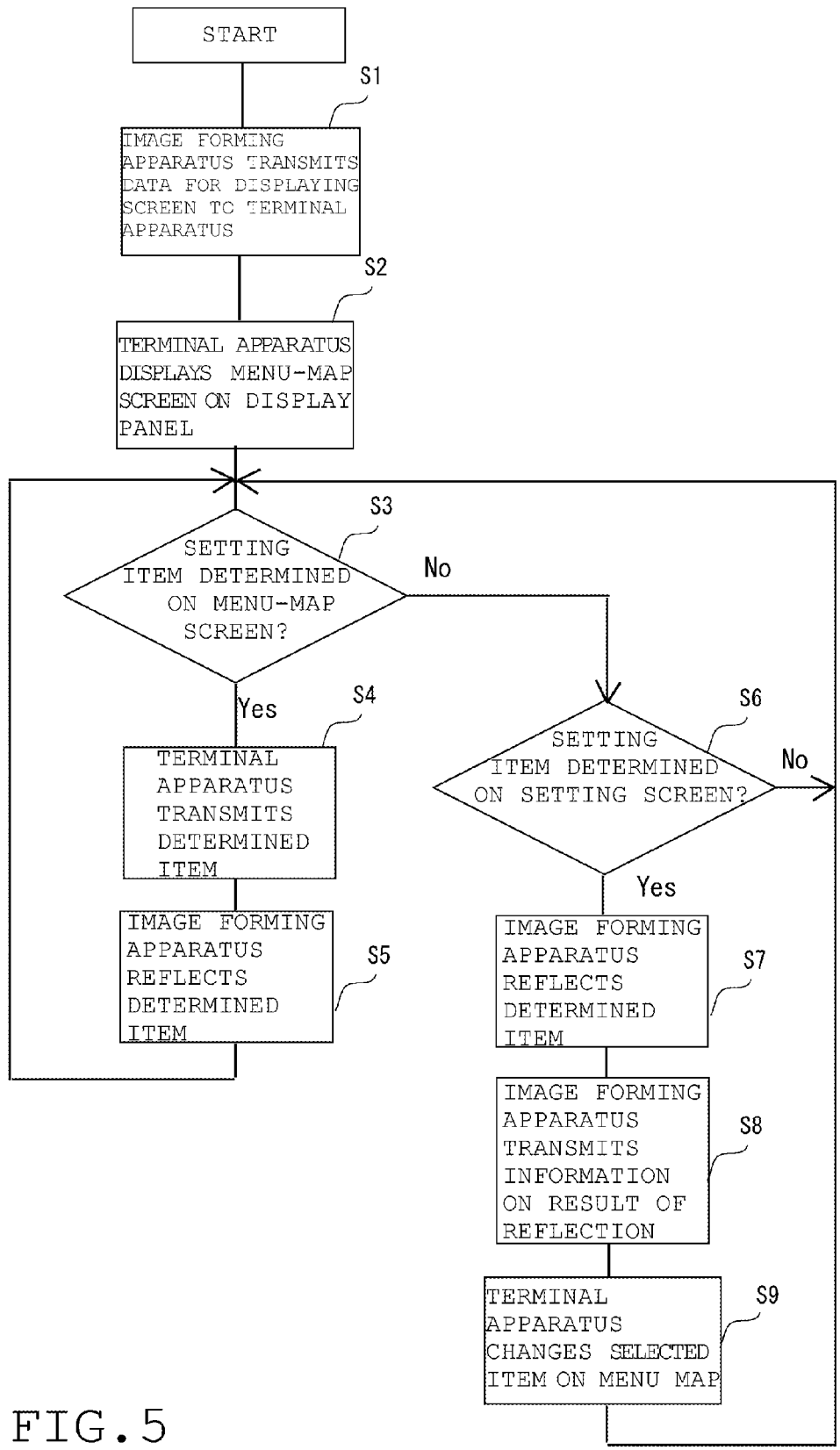
FIG. 5 is a flowchart schematically illustrating a menu-map screen display process.

FIG. 5 is a flowchart schematically illustrating the menu-map-screen display process.

In the menu-map screen display process, when the operation panel part 6 is operated to change the setting of the image forming apparatus 1, the image forming apparatus 1 starts an operating of changing the setting thereof. Then, the image forming apparatus 1 transmits data necessary to display a menu-map screen to the terminal apparatus 9 (S1). Upon reception of the data, the terminal apparatus 9 displays a menu-map screen on the display panel 98 (S2). At this time, the terminal apparatus 9 highlights the setting item selected on the display panel 61.

Thereafter, the terminal apparatus 9 discriminates whether an operation for determining a setting item is performed on the menu-map screen (S3). When the operation for determining a setting item is performed on the menu-map screen, the terminal apparatus 9 transmits information on the determined setting item to the image forming apparatus 1 (S4).

The image forming apparatus 1 receives this information. The image forming apparatus 1 reflects a result of the operation of the terminal apparatus 9 onto the setting and the display on the display panel 61 (S5). Specifically, the image forming apparatus 1 changes the setting screen to be displayed on the display panel 61 to a setting screen for the setting item indicated by the transmitted information. The image forming apparatus 1 also changes the setting to the setting item determined on the terminal apparatus 9. Then, the image forming apparatus 1 returns the process to S3. The image forming apparatus 1 repeatedly performs the processes of S4 and S5 every time the operation for determining a setting item is performed on the menu-map screen.

The image forming apparatus 1 also discriminates whether an operation for determining a setting item is performed by operating the operation panel part 6 (S6). With this operation performed, the image forming apparatus 1 reflects the operation (S7). Specifically, the image forming apparatus 1 changes the setting screen to be displayed on the display panel 61 to a setting screen for the determined setting item.

When the setting screen to be displayed on the display panel 61 is changed, the image forming apparatus 1 transmits information on the setting item selected on the changed setting screen to the terminal apparatus 9 (S8). Upon reception of this information, the terminal apparatus 9 changes the setting item selected on the display panel 98 to the item selected on the display panel 61 (S9).

Figure 6A:
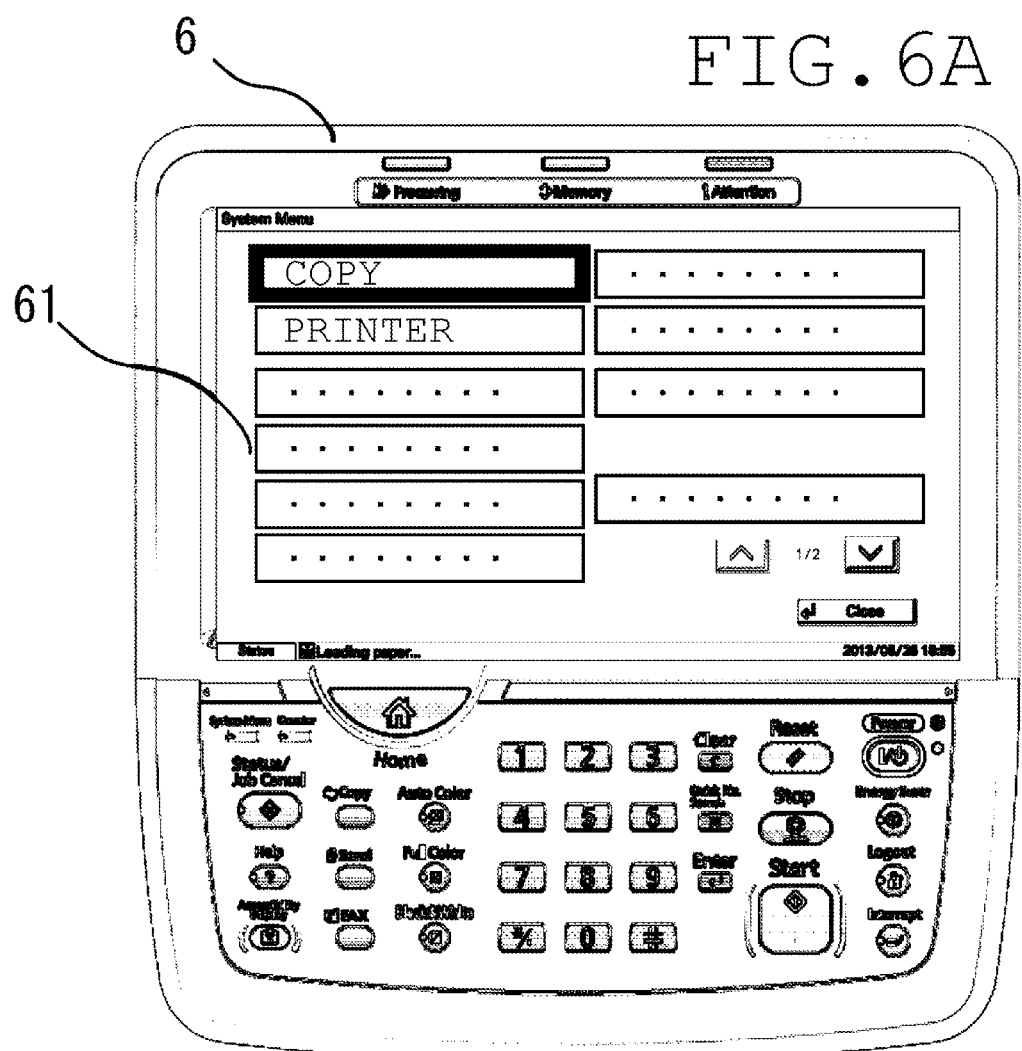
FIG. 6A is a diagram showing an operation panel part and a display panel.
Figure 7B:
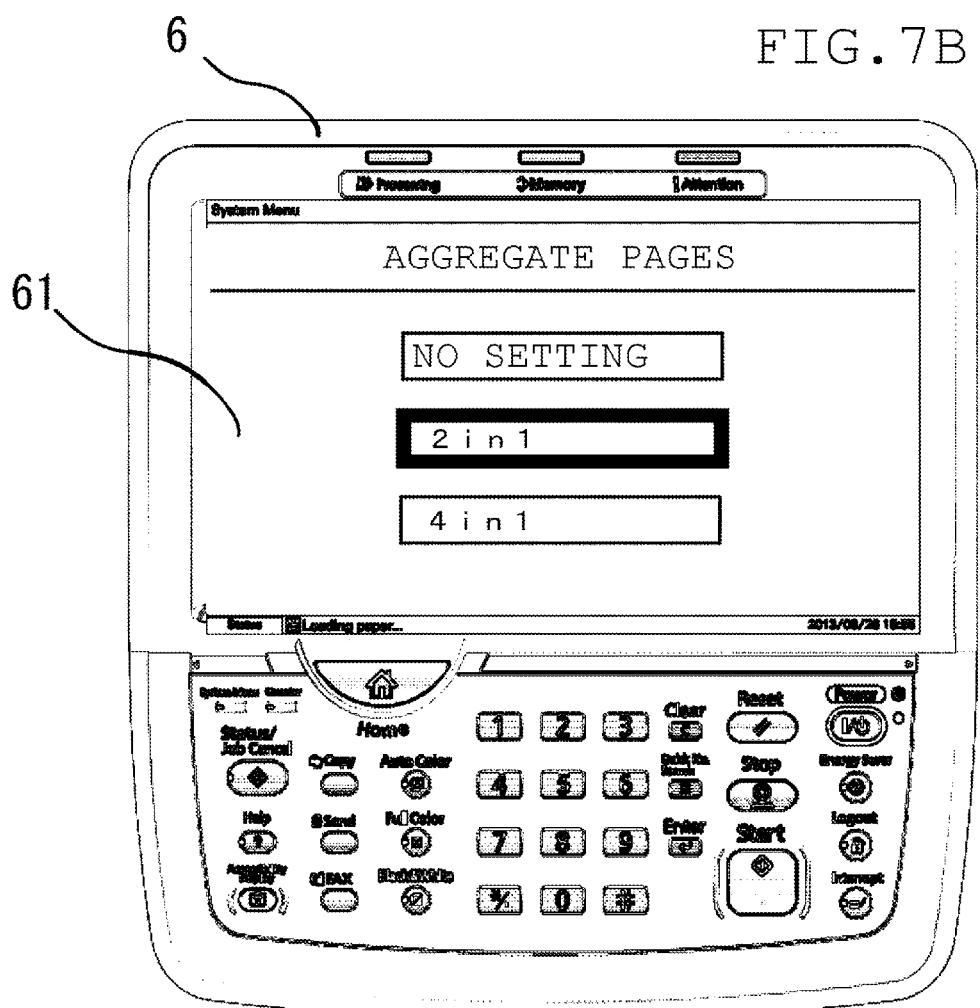
FIG. 7B is a diagram showing the operation panel part and the display panel.

The following describes what is displayed on the display panel 61 and the display panel 98 in the above-described menu-map screen display process. FIG. 6A is a diagram showing the operation panel part 6. FIG. 6B is a diagram showing the display panel 98. FIG. 7A is a diagram showing the display panel 98. FIG. 7B is a diagram showing the operation panel part 6.

As shown in FIG. 6A, when the operation for changing the setting is performed at the operation panel part 6, the display panel 61 displays the setting screen of the image forming apparatus 1. Accordingly, the display panel 98 displays a menu-map screen showing setting items for the image forming apparatus 1 in the form of a menu map as shown in FIG. 6B. The setting item selected by the user operating the operation panel part 6 and the terminal apparatus 9 is highlighted in a bold frame on the display panel 61 and the display panel 98. In the examples shown in FIGS. 6A and 6B, the setting item "Copy" selected on the display panel 61 and the display panel 98 highlighted in a bold frame. In addition, setting items, such as "Select Sheet," "Enlarge/Reduce" and "Aggregate Pages," are displayed on the display panel 98. The following illustrates an example of changing the setting for "Aggregate Pages" on the display panel 98 of the terminal apparatus 9. On the display panel 98, the item of "Aggregate Pages" in the setting items of "Copy" is set to "OFF" which is the initial setting for "Aggregate Pages" of the image forming apparatus 1 and is highlighted by filling.

When the terminal apparatus 9 is operated to select an item "ON" for selecting the setting "2 in 1" for "Aggregate Pages" from the setting items of "Copy" on the display panel 98, highlighting of "OFF" of "Aggregate Pages" by filling is canceled as shown in FIG. 7A. In this case, the setting item "ON" for "2 in 1" is highlighted in a bold frame. When the setting item for "2 in 1" is determined, according to the operation of the terminal apparatus 9, as shown in FIG. 7B, the setting screen for "Aggregate Pages" is also displayed on the display panel 61. At this time, the setting item for "2 in 1" determined on the terminal apparatus 9 is highlighted by filling. The image forming apparatus 1 changes the setting for "Aggregate Pages" to the setting for "2 in 1."

Figure 9A:
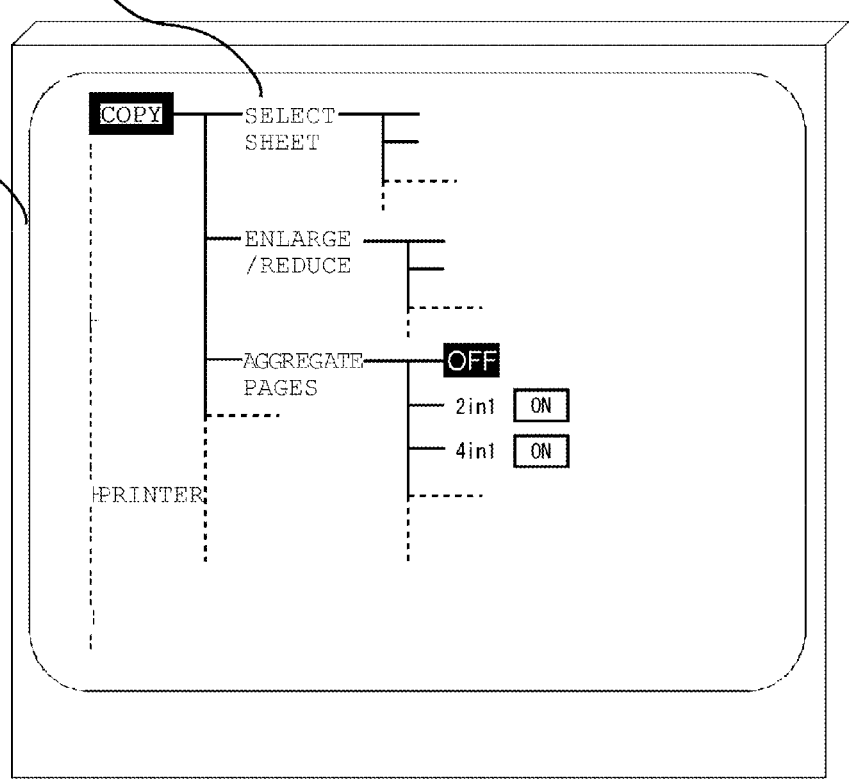
FIG. 9A is a diagram showing the terminal apparatus and the display panel.

Next, a case where the setting item is changed on the image forming apparatus 1 is described. The image forming apparatus 1 is operated to select setting items for "Aggregate Pages" with the setting item "Copy" selected on the display panel 61 as shown in FIG. 8A. At this time, the setting screen for "Aggregate Pages" as shown in FIG. 8B is displayed, and the setting item "2 in 1" is determined on the setting screen. Then, the highlighting of "OFF" for "Aggregate Pages" is canceled as shown in FIG. 9B from the state where the setting item "Copy" is highlighted in a bold frame as shown in FIG. 9A. At this time, the setting item "ON" for "2 in 1" in "Aggregate Pages" is highlighted in a bold frame. As apparent from the above, the display panel 98 and the display panel 61 are synchronized with each other in the image forming system.

The above-described configuration can provide the following advantages.

According to a typical case, the screen of a personal data assistant apparatus or a mobile terminal needs to be changed in order to find a function a user desires. In addition, because the display screen of a personal data assistant apparatus or a mobile terminal is not working together with the display screen of an image processing apparatus or a multifunction apparatus, a user cannot change the setting or make execute a job on the personal data assistant apparatus or the mobile terminal.

In contrast, according to the present disclosure, a menu map for setting items is displayed on the terminal apparatus, so that the user can quickly reach the desired setting item.

Further, according to the embodiment, the display panel 98 and the display panel 61 are synchronized with each other, so that changing the setting or changing the screen can be carried out by using the terminal apparatus 9. Furthermore, alteration of the setting or a job operation can be resumed between the terminal apparatus 9 and the image forming apparatus 1.

The above-described configuration and operation of the embodiment are just illustrative, and may of course be modified as needed without departing from the scope and purport of the present disclosure.

For example, the terminal apparatus 9 may be a personal digital assistant apparatus such as a smartphone or a cellular phone, or a terminal apparatus such as a personal computer, which is not carried around.

What is claimed is:

1. An image forming system for allowing a terminal apparatus to manipulate a setting screen of an image forming apparatus, wherein:
   the terminal apparatus includes a CPU and a display panel, the CPU of the terminal apparatus:
      displays, on the display panel, a screen on which setting items for the image forming apparatus are displayed in a form of a menu map ('menu-map screen'),
      determines a setting item selected among the setting items on the menu map screen based on an operation of the terminal apparatus while highlighting the determined setting item, and
      transmits a result of an operation on the determined setting item to the image forming apparatus,
   the image forming apparatus includes a CPU and an operation panel,
   the CPU of the image forming apparatus:
      transmits, to terminal apparatus, data necessary to display setting items on the menu map screen when a setting change of the image forming apparatus is started by operation of the operation panel, and
      reflects the result of the operation transmitted from the terminal apparatus on a setting of the image forming apparatus and the setting screen, and
   the CPU of the terminal apparatus highlights the setting item selected among the setting items on the menu map screen based on the data transmitted from the image forming apparatus.

2. A setting screen manipulating method for allowing a terminal apparatus to manipulate a setting screen of an image forming apparatus, including:
   a CPU of the terminal apparatus displaying, on a display panel of the terminal apparatus, a screen on which setting items for the image forming apparatus are displayed in a form of a menu map ('menu map screen'),
   the CPU of the terminal apparatus determining a setting item is selected among the setting items on the menu map screen based on an operation of the terminal apparatus while highlighting the determined setting item,
   the CPU of the terminal apparatus transmitting a result of an operation on the determined setting item to the image forming apparatus,
   a CPU of the image forming apparatus transmitting, to the terminal apparatus, data necessary to display setting items on the menu map screen when a setting change of the image forming apparatus is started by operation of an operation panel of the image forming apparatus,
   the CPU of the image forming apparatus reflecting the result of the operation transmitted from the terminal apparatus on setting of the image forming apparatus and the setting screen, and
   the CPU of the terminal apparatus highlighting the setting item selected among the setting items on the menu map screen based on the data transmitted from the image forming apparatus.

\* \* \* \* \*